US010359202B1

(12) United States Patent
Prather

(10) Patent No.: US 10,359,202 B1
(45) Date of Patent: Jul. 23, 2019

(54) AIR CONDITIONING/HEATING AIRFLOW CONTROL METHOD AND SYSTEM

(71) Applicant: Donald B. Prather, Panama City Beach, FL (US)

(72) Inventor: Donald B. Prather, Panama City Beach, FL (US)

(*) Notice: Subject to any disclaimer, the term of this patent is extended or adjusted under 35 U.S.C. 154(b) by 0 days.

(21) Appl. No.: 16/174,650

(22) Filed: Oct. 30, 2018

(51) Int. Cl.
*F24F 3/00* (2006.01)
*F24F 3/044* (2006.01)
*F24F 5/00* (2006.01)
*F24F 11/30* (2018.01)
*F24F 11/76* (2018.01)
*F24F 13/06* (2006.01)
(Continued)

(52) U.S. Cl.
CPC ............... *F24F 3/00* (2013.01); *F24F 3/044* (2013.01); *F24F 5/001* (2013.01); *F24F 11/30* (2018.01); *F24F 11/72* (2018.01); *F24F 11/76* (2018.01); *F24F 13/06* (2013.01); *G05B 19/042* (2013.01); *G05B 2219/2614* (2013.01)

(58) Field of Classification Search
CPC .... F24F 3/00; F24F 11/72; F24F 13/06; F24F 11/76; F24F 11/30; F24F 5/001; F24F 3/044; G05B 19/042; G05B 2219/2614
See application file for complete search history.

(56) References Cited

U.S. PATENT DOCUMENTS 3,899,022 A * 8/1975 Persson ................. F24F 3/0442
165/217

4,045,973 A * 9/1977 Anderson ............ F24F 11/0009
318/778

(Continued)

FOREIGN PATENT DOCUMENTS

JP         S_5743140 A        3/1982

*Primary Examiner* — Christopher E. Everett
(74) *Attorney, Agent, or Firm* — Bacon & Thomas, PLLC

(57) ABSTRACT

Individual zone temperature control sensors in a multiple zone system are monitored by a controller, and when one zone calls, the calling zone is allocated all of the airflow from the HVAC system except for a predetermined minimum that is allocated to the other zones. If all zones have equal priority, then the airflow continues to be supplied to the first calling zone until a temperature condition is satisfied, at which time the full airflow is allocated to a second calling zone and only the predetermined minimum is supplied to the first and all other calling zones. When two or more zones having different priorities, or set point deviations, are calling at the same time, the zone with the highest priority or whose temperature is furthest from a set point will become the single zone that is open and receives all of the air except for the predetermined minimum. Air continues to be supplied to that zone until it has achieved a desired temperature, until a higher priority zone calls, or until another zone is furthest from the set point. In order to provide maximum airflow to single zones according to the method of the invention, duct and outlet sizes must be larger than is necessary for conventional systems in which more than the minimum airflow is simultaneously allocated to multiple zones. Instead of utilizing conventional duct size calculations that assume simultaneous allocation of airflow to multiple zones, the design sizes the ducts in each zone to carry 100% of the system's airflow less the predetermined minimum.

9 Claims, 3 Drawing Sheets

(51) Int. Cl.
*G05B 19/042* (2006.01)
*F24F 11/72* (2018.01)

(56) References Cited

U.S. PATENT DOCUMENTS

| | | | | |
|---|---|---|---|---|
| 4,086,781 A * | 5/1978 | Brody | ............... | F24F 11/74 62/180 |
| 4,487,363 A * | 12/1984 | Parker | ............... | G05D 16/208 236/49.3 |
| 4,495,986 A * | 1/1985 | Clark | ............... | F24F 3/0442 165/101 |
| 4,549,601 A * | 10/1985 | Wellman | ............... | F24F 3/0442 165/205 |
| 4,600,144 A * | 7/1986 | Zelczer | ............... | G05D 23/1934 165/218 |
| 4,630,670 A * | 12/1986 | Wellman | ............... | F24F 3/0442 165/216 |
| 4,673,029 A * | 6/1987 | Beachboard | ............... | F24F 3/0527 165/217 |
| 4,830,095 A * | 5/1989 | Friend | ............... | F24F 3/044 165/208 |
| 5,535,814 A * | 7/1996 | Hartman | ............... | F24F 11/30 165/217 |
| 6,879,881 B1 * | 4/2005 | Attridge, Jr. | ............... | F24F 11/30 700/277 |
| 6,964,174 B2 * | 11/2005 | Shah | ............... | F24F 3/0442 165/205 |
| 7,819,331 B2 * | 10/2010 | Arneson | ............... | F24F 11/30 236/1 B |
| 8,061,417 B2 | 11/2011 | Gray | | |
| 9,097,432 B2 * | 8/2015 | Kreft | ............... | F24F 3/14 |
| 2003/0213852 A1 * | 11/2003 | Demster | ............... | E04B 9/02 236/49.3 |
| 2005/0156050 A1 * | 7/2005 | Shah | ............... | F24F 3/0442 236/1 B |
| 2005/0156054 A1 * | 7/2005 | Shah | ............... | F24F 3/0442 236/49.3 |
| 2010/0102135 A1 * | 4/2010 | Alles | ............... | F24F 3/044 236/49.1 |
| 2016/0195297 A1 * | 7/2016 | Fan | ............... | F24F 13/24 165/217 |
| 2018/0292103 A1 * | 10/2018 | Modera | ............... | F24F 11/79 |

\* cited by examiner

Table 1: Zone 1 Calc. for FAZS Supply Duct Sizing CFM

| No Bypass less 10% Minimum Position for Zones 2 & 3 (600 – 249) × 0.10 = 35.1 600 – 35.1 = 564.9 | | | |
|---|---|---|---|
| Diffuser # | Duct Design CFM/B | % 249 CFM (Rm. CFM/249) | New Duct Design CFM % × 565 |
| Kitchen 1 | 45 | 0.18 | 102 |
| Kitchen 2 | 44 | 0.18 | 102 |
| Great Rm 1 | 43 | 0.17 | 96 |
| Great Rm 2 | 43 | 0.17 | 96 |
| Great Rm 3 | 43 | 0.17 | 96 |
| Great Rm 4 | 24 | 0.10 | 57 |
| Closet | 7 | 0.03 | 17 |

Note: Total Duct Design CFM B for Zone 1 = 249 CF

FIG. 3

Table 2: Zone 2 Calc. for FAZS Supply Duct Sizing CFM

| No Bypass less 10% Minimum Position For Zones 1 & 3 (600 – 226) × 0.10 = 37.4 600 – 37.4 = 563 | | | |
|---|---|---|---|
| Diffuser # | Duct Design CFM/B | % 226 CFM (Rm. CFM/226) | New Duct Design CFM % × 563 |
| Bed Rm 3 | 60 | 0.27 | 152 |
| Bath Rm 1 | 14 | 0.06 | 34 |
| M. Bed B | 37 | 0.16 | 90 |
| M. Bed | 32 | 0.14 | 79 |
| Bed Rm 2 | 30 | 0.13 | 73 |
| Bed Rm 2 | 30 | 0.13 | 73 |
| M. Bath | 23 | 0.10 | 56 |

Fig. 4

Table 3: Zone 3 Calc. for FAZS Supply Duct Sizing CFM

| No Bypass less 10% Minimum Position for Zones 1 & 2 (600 – 223) × 0.10 = 37.7 600 – 37.7 = 562 | | | |
|---|---|---|---|
| Diffuser # | Duct Design CFM/B | % 223 CFM (Rm. CFM/223) | New Duct Design CFM % × 562 |
| Rec. Rm. 1 | 62 | 0.28 | 157 |
| Rec. Rm. 2 | 62 | 0.28 | 157 |
| Utility Rm | 53 | 0.24 | 135 |
| Ex. Rm. | 46 | 0.21 | 118 |

Fig. 5

AIR CONDITIONING/HEATING AIRFLOW CONTROL METHOD AND SYSTEM

BACKGROUND OF THE INVENTION

1. Field of the Invention

The invention relates to a method and system for controlling distribution of air in a multiple zone air conditioning and/or heating system.

2. Description of Related Art

In a conventional multiple zone heating and air conditioning (HVAV) system with a central controller, distribution of heated or chilled air is controlled by opening and closing dampers or vents in response to signals or calls received by the central controller from thermostats or temperature sensors in the respective zones. For example, when the temperature in a zone is warmer than a preset temperature, chilled air from a compressor is allowed to pass into the area through a damper. The damper remains open until the temperature has cooled to the preset temperature. In general, each of the zones is independently controlled to receive a portion of the airflow as necessary to maintain the preset temperatures in respective zones. Because each zone normally receives at least a portion of the total output of the HVAC unit, the ducts and diffusers or vents are sized to receive less than the total output, based in large part on the relative sizes and configuration of rooms or spaces in the zones, To ensure that particular zones receive sufficient airflow to maintain the desired temperature as rapidly as possible even when more than once zone is below or above the desired temperature, it is known to prioritize the distribution of heated or cooled air, so that a larger volume of cooling or heating air is supplied to zones with higher priority, The priority can be based on which rooms are more likely to be occupied at particular predetermined times, on actual occupancy of the zone as determined by sensors, on the relative needs of the occupants (for example, the elderly or infants might be more temperature sensitive), or on other factors. On the other hand, if the supply of chilled or warmed air output by the heating or cooling system is greater than required by all calling zones, excess air may be dumped by vented out of the building or to areas that are unoccupied.

U.S. Pat. No. 8,061,417 discloses a simple multiple zone HVAC airflow control scheme in which airflow is reallocated to a priority zone whenever resources in the priority zone are inadequate to meet demand, but numerous variations of this basic scheme are possible and have been previously proposed in a number of patents and publications.

For example, U.S. Pat. No. 4,830,095 describes a control "sequence" in which not just a portion of the total HVAC output, entire output is diverted to one or more zones based on thermostat calls and assigned priorities. This is similar to the scheme employed by the present invention in that the total HVAC output is allocated to calling or priority zones, but there is no attempt to limit supply of the total output to a single zone, even if multiple zones are calling and have identical priorities, or to sequence the air supply from one calling zone to another even when the zones have equal priority. In the control scheme of U.S. Pat. No. 4,830,095, air will be supplied to the one or more zones with highest priority for as long as air supply is called for by the thermostat in the zone. If multiple zones have equal priority, then air is supplied simultaneously to each zone, based on the thermostat calls. Thus, this patent describes a sequence in which this patent describes a control sequence in which air is initially supplied to zone 1 upon receiving a thermostat call, by allowing the damper for zone 1 to remain open while the damper to zone 2 is closed, after which air is supplied to zone 2 upon receiving a thermostat call by opening the damper to zone 2 and closing the damper to zone 1. Any zones that are independent will receive air simultaneously based on thermostat calls or in the absence of priority.

Additional prioritization schemes are disclosed in U.S. Pat. No. 4,673,029, in which prioritization is accomplished by disabling the thermostat in one zone and having the thermostat in the other zone control the division of air between the zones, and U.S. Pat. No. 4,600,144, which describes anticipated usage-based prioritization in which airflow to selected rooms or zones is shut off at intervals during a 24 hour period to account for daytime and nighttime differences in usage.

In contrast, Japanese Patent Publication No. JPS5743140, discloses a "time division system" flow rate control method in which a set of dampers or "valves" in one zone is opened while valves in all other zones are maintained in a closed condition. The zones are sequenced so that after predetermined time, the valves for the next zone are opened and those for all other zones, including the first zone, are closed. This is similar to the sequencing provided by the present invention in that aft is distributed to only one zone at a time. However, the control scheme described in the Japanese publication differs from that of the present invention in that (a) the system to which the control scheme is applied is a variable flow rate system in which the valves are only opened by an amount sufficient to maintain a minimum flow rate, and (b) the sequencing is predetermined, based solely on time division, rather than determined by thermostat calls and/or programmable priority.

The present invention not only involves an HVAC airflow allocation scheme, but also a modified duct and damper design, in which ducts are enlarged to accommodate a larger percentage of the HVAC total output. U.S. Pat. No. 6,964, 174 also discloses duct size calculation based on a determination of expected airflow requirements, but there is no attempt to ensure that each zone can receive maximum system airflow as in the present invention. To the contrary, control of the system requires reduction in airflow to a particular zone, if possible, and dumping to unoccupied zones if an expected zone airflow exceeds its maximum airflow.

By way of additional background, U.S. Pat. No. 7,819, 331 discloses "staging" of the conditioning device in a VAV system in which the airflow is varied, i.e., changing the airflow volume in response to the duration and sequence of thermostat calls rather than distributing a fixed airflow as in preferred embodiments of the present invention.

Finally, U.S. Pat. No. 4,549,601 discloses a variable volume, multiple zone control system in which dampers in at least one zone are always left fully open to maintain a minimum static pressure in the system.

In general, the conventional airflow control schemes described above have worked well and are widely accepted, even though some challenges exist, including problems related to delivering and returning required heating or cooling capacity to rooms in tight home that require low airflows. While numerous variations based on prioritization have been proposed, the basic scheme of allocating airflow to whichever zones require airflow or have priority, has not been questioned. It is very surprising, therefore, to discover a control scheme that alters the conventional allocation scheme and achieves substantial increases in efficiency solely by altering programming of the central controller and by making simple changes in the duct and damper size calculations.

SUMMARY OF THE INVENTION

It is accordingly an objective of the invention to provide an airflow control method and system for multiple zones that achieves substantial improvements in efficiency without requiring any modifications of the conventional HVAC system other than changes in programming of the central controller and modification of duct and damper size calculations.

It is also an objective of the invention to provide an airflow control method that solves problems related to delivering and returning required heating or cooling energy to rooms in tight homes that require low airflows.

These objectives, which are not intended to be limiting, are achieved by a control system and method in which each zone is arranged to be allocated a maximum airflow output of the HVAC unit, minus a predetermined minimum that is allocated to zones. During operation of the system, only one zone at a time is supplied the full airflow (i.e., the maximum output less the predetermined minimum), while the predetermined minimum is allocated to all of the other zones.

According to a preferred embodiment of the system and method of the invention, initial allocation is by a call from a thermostat or sensor in one of the zones. Once air supply to the initial calling zone has started, the calling zone continues to be supplied with air until a desired set point has been achieved.

Optionally, airflow can be switched from the initial calling zone to another calling zone based on priority or on deviation of from a thermostat or temperature sensor set point. Upon switching to a higher priority zone, or a zone with a greater deviation from the set point, airflow to the initial zone is reduced to the predetermined minimum and airflow to the second zone is increased to maximum, less the predetermined minimum. During switching from a first zone to a second zone, the diffusers in the first zone must be left open until the diffusers in the second zone are fully open, or some other outlet or bypass must be provided to avoid over pressurization.

In order to accommodate the maximum airflow, the invention provides for duct design modifications in which the ducts and diffusers in each zone are enlarged to accommodate a maximum HVAC unit output, minus a small airflow necessary to provide adequate minimum ventilation to zones not supplied with the full airflow. The calculations are modifications of, and can utilize principles described in, conventional HVAC design manuals such as Manual Zr, Manual T, Manual S, and Manual J.

An optional delay step may be added to the basic airflow control method to prevent the air conditioning equipment from short cycling, the delay step preventing the condenser from being restarted until after a predetermined interval if the conditions in a zone are met before the interval has elapsed from the initial start. In an illustrated example, the delay is five minutes, but the delay interval can be varied according to manufacturer requirements for specific equipment.

While the method of the invention is especially suitable for single speed systems, it is possible to apply the same design and control criteria for multiple or variable speed systems, with full flow to one zone being provided for whenever the system is operated at low speed.

In addition to the advantages listed above in connection with objectives of the invention, the design sequence and control strategy of the invention simplification of airflow balancing, lower blower operating costs, and improved humidity control by maintaining coil temperature and fan speed at the design values. The method of the invention meets the zone requirements on all days, under all weather conditions because the zones are not proportionally dependent on a single load value, and because the method of the invention self-adjusts for the differences in heating and cooling loads for zones. The hardware for implementing the method and system of the invention is not only commercially available, but is already available from many manufacturers, while the software programming can easily be accomplished by modifying existing zone control systems.

BRIEF DESCRIPTION OF THE DRAWINGS

FIGS. 3-5 are tables illustrating, by example, duct capacity design principles of the preferred embodiments of the invention.

DETAILED DESCRIPTION OF THE PREFERRED EMBODIMENTS

The present invention is a multiple zone airflow control method and system that directs all air, minus a predetermined minimum, to one zone at a time. The control system and method of the invention utilizes the following principles:

a. Individual zone temperature control sensors or thermostats are monitored by a controller. When one zone calls by sending a signal indicative of a difference between sensed temperature and a set point, the calling zone is allocated all of the airflow output by a central from the HVAC limit, minus a predetermined minimum that is allocated to the other zones.

b. When two or more zones are calling at the same time, the zone with the highest priority or whose temperature is furthest from a set point will become the single zone that is open and receives all of the airflow, minus the predetermined minimum. Air continues to be supplied to the initial calling zone until it has achieved a desired temperature, until a higher priority zone calls, or until another zone calls and is further from the set point than the initial calling zone.

c. In order to provide maximum airflow to single zones according to the method of the invention, duct and outlet sizes must be larger than is necessary for conventional systems in which more than the minimum airflow is simultaneously allocated to multiple zones. Instead of utilizing cooling and heating factor calculation procedures based on division of total HVAC unit output, the inventive design sizes the ducts and/or diffusers and return grilles to carry 100% of the system's airflow less the predetermined minimum.

The predetermined minimum supplied to the zones other than the calling or priority zone may, by way of example and not limitation, amount to 10% of the total airflow. This ensures a minimum air circulation in order to provide the uniform mixing of outside air that is recommended for highly sealed homes, similarly to the minimum airflow required for commercial variable air volume (VAV) systems. One way to achieve the 10% setting is to arrange the dampers that control the airflow to a zone so that they cannot be completely shut, but instead have an opening of 10% the maximum opening when in the "closed" position. Alternatively, a percentage of the dampers in a zone may be left in an open position to provide the necessary ventilation, while the majority of dampers are shut. Those skilled in the art will appreciate that the minimum value of 10% may be varied to meet environmental or health requirements without departing from the scope of the invention.

Figure 1:
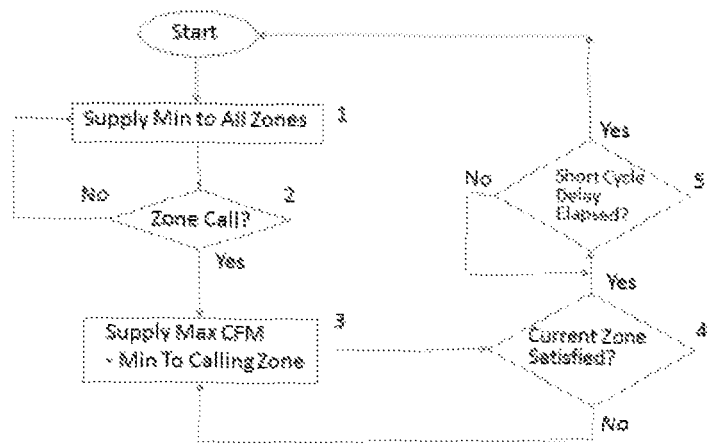
FIG. 1 is a flowchart of a control and sequencing method for controlling distribution of airflow in a multiple zone HVAC system according to a first preferred embodiment of the present invention.

FIG. 1 is a flowchart illustrating basic control principles of a first preferred embodiment of the invention, in which a first-called zone is supplied with maximum air flow, The maximum airflow is defined as airflow to a zone in which the dampers are all open, minus the predetermined minimum that is supplied to all other zones. Initially, as indicated by block 1, the control system waits for a call from a thermostat or temperature sensor in one of the zones, indicating that the sensed temperature is above or below a set amount by a predetermined amount. The arrangement of the thermostat or sensor and the manner in which calls are made by the thermostat or sensor and received by the controller is conventional. When a call is received, the controller proceeds to step 2, and opens the dampers in the calling zone to supply 100% of a fixed airflow from a central heating or air condition unit to the zone, minus a predetermined minimum as described above. Dampers in each of the non-calling zones remain shut to only permit the predetermined minimum airflow.

The controller continues to supply air to the current calling zone until the current zone is satisfied, i.e., the set point has been achieved, as determined at step 3, at which time the controller will shut off the maximum air supply to the current zone and return to step 1, in which a minimum airflow is supplied to all zones. If a second zone has called, as determined at step 2, then the maximum airflow is supplied to the second zone until the second zone is satisfied, at which time the control system switches the next zone to call.

An optional delay step 5 may be inserted to prevent the air conditioning equipment from short cycling, a delay may be included to prevent the condenser from being restarted until after a predetermined interval if the conditions in a zone are met before the interval has elapsed from the initial start. The delay may be five minutes, but this delay can vary according to manufacture requirements for specific equipment.

Figure 2:
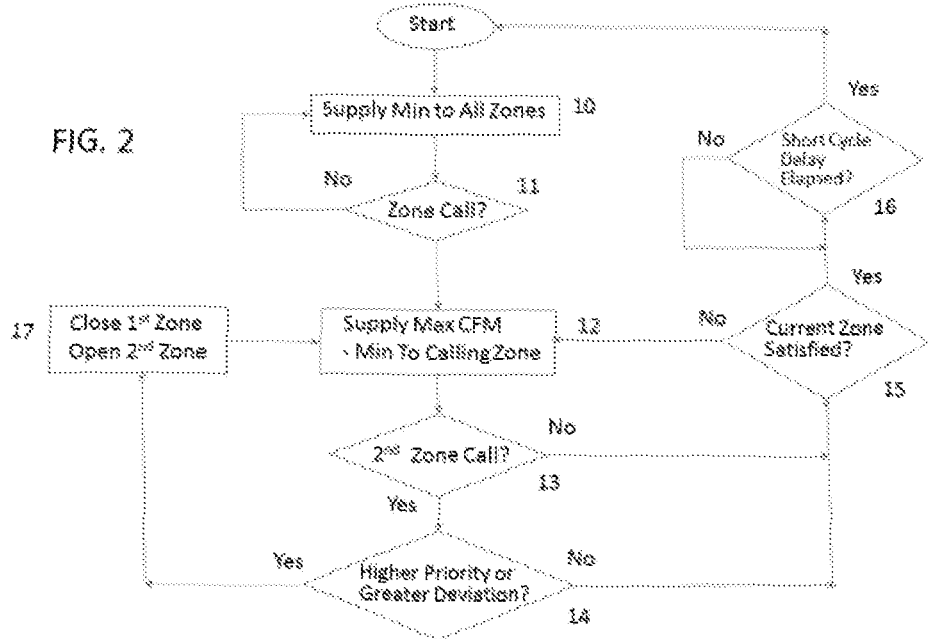
FIG. 2 is a flowchart of an airflow control and sequencing method for controlling distribution of airflow in a multiple zone HVAC system according to a second preferred embodiment of the present invention.

FIG. 2 is a flowchart illustrating the basic control principles of a second preferred embodiment of the present invention, which provides for switching of the maximum airflow from a first zone to a second zone before the first zone has been satisfied, based on priority or deviation in temperature from a set point. Initially, in step 10, the system supplies a minimum airflow to all zones, and the control system waits for a call from a thermostat or temperature sensor in one of the zones, indicating that the sensed temperature is above or below a set amount, as determined in step 11. As with the first embodiment, the arrangement of the thermostat or sensor and the manner in which calls are made by the thermostat or sensor and received by the controller in this embodiment are conventional.

When a sensor call is received, the controller proceeds to step 12, and opens the dampers in the calling zone to supply 100% of a fixed airflow from a central heating or air conditioning unit to the zone, minus a predetermined minimum as described above. Dampers in each of the non-calling zones remain shut to only permit the predetermined minimum airflow.

When a call is received from a zone other than the one currently being supplied with maximum airflow, as determined at step 13, the controller checks the priority of the zone or, alternatively, whether the zone is further from the set temperature than the zone currently being supplied, as determined at step 14. If another zone has not called, or does not have a higher priority or distance from the set point, the controller continues to supply air to the current calling zone until the current zone is satisfied, i.e., the set point has been achieved, as determined at step 15, at which time the controller will shut off the maximum air supply to the current zone.

As described above in connection with FIG. 1, an optional delay step 16 may be inserted to prevent the condenser from being restarted until after a predetermined interval if the conditions in a zone are met before the interval has elapsed from the initial start.

If the controller determines at step 14 that a second calling zone does have a higher priority or is further from the set point, then the controller will first fully open the second calling zone to the maximum airflow position before shutting off the maximum air flow to the first calling zone, as indicated by step 17, in order to accomplish a switchover or shift between zones. Shifting between zones is thus accomplished by permitting dampers in an open zone to remain open until the next zone is able to receive the full airflow in order to avoid over pressurization of the duct system.

If priority rather than set point deviation is used as the basis for determining which zone is allocated the maximum airflow, then the priority may be set by a user according to specific needs. For example, the suite of an elderly person or infant can be set to always have priority over other zones. The priority could also be based on occupancy, time of day, nature of the zone, or any other basis for determining which zone should be first to receive heating or cooling airflow following a function call. In addition, priority levels can be combined so that, for example, the suite of an elderly person or infant can be accorded the highest priority when occupied, and a lower priority when unoccupied.

Although the present invention can be applied to any multiple zone HVAC system, a smaller number of larger zones make the system simpler and more efficient to operate that a large number of smaller zones. For single speed systems, optimal efficiency is obtained for zones that are approximately ⅓ of the load. When individual zones approach 20% of the load, it more efficient to switch to a variable speed system, although it is possible to apply the control system of the invention to systems that includes zones with less than 20% of the airflow by including a bypass to handle excess air. The allowable bypass airflow should be less than 12% of the blower output (typically expressed in cubic feet per minute or CFM) when the zone with the smallest CFM requirement is operating.

Control of airflow can be achieved using a conventional, commercially available multiple-zone HVAC controller. The controller typically includes a processor, a programming interface, a memory for storing the control sequence, and an interface that allows connections to the central HVAC unit, temperature sensors or thermostats, and individual diffusers or dampers to control airflow in individual zones. The connections may be standard wired connections and/or wireless/network connections.

Other than modified programming as described above, the only modification required to implement the method and system of the preferred embodiments is enlargement of duct and/or diffuser opening sizes to accommodate increased airflow. An example of the manner in which ducts sizes are enlarged is included in FIGS. 3-5, which show tables comparing standard ducts in an exemplary three zone HVAC system with ducts that are modified in accordance with the principles of the invention.

The central HVAC unit in the example of FIGS. 3-5 has an output of 600 CFM. When the airflow is allocated in conventional fashion, the allocation is such that zone 1 is designed to receive a maximum of 249 CFM, zone 2 to receive 226 CFM, and zone 3 to receive 223 CFM, which is the total of the first numerical column in each table labeled as Duct Design CFM J8. The designation "J8" refers to calculations in the publication *Manual J Duct Design CFM*. Each of the entries represents a percentage of the 249 CFM total, based on room size and diffuser throw and spread.

The third numerical column in each of the tables included in FIGS. 3-5 for the three zones represents CFM values for the enlarged ducts of the preferred embodiments of the invention. Instead of the J8 calculations, the duct sizes in column 3 are, based on the formulas:

$$\text{Zone CFM} = \text{Total CFM} - \text{Minimum CFM} \quad (1)$$

$$\text{Duct CFM} = \text{Zone CFM} \times \text{Percentage} \quad (2)$$

The variable "Zone CFM" represents the maximum airflow that is allocated to the initial calling zone, as described above. The variable "Total CFM" is the total output of the central HVAC unit that is available to the zone. The variable "Duct CFM" is based on a percentage of the Zone CFM based on the percentage of total Zone CFM that is distributed to each duct in the zone. The "Percentage" value is a function of duct and diffuser geometry and may be calculated by standard methods based on room size and required diffuser throw and spread, as set forth in *Manual J*. These percentage calculations for relative sizes of ducts within a zone are unaffected by and form no part of the present invention. Finally, the variable "Minimum CFM" is the minimum percentage that needs to be allocated to other zones. "Minimum CFM" may be calculated in a variety of ways but, in the example given in the tables is calculated by subtracting the conventional J8 value from the total CFM and multiplying the result by 10%:

$$\text{Minimum CFM} = (\text{Total CFM} - \text{J8 Value}) \times 0.1 \quad (3)$$

Both the percentage 0.1 and the J8 value may be varied depending on health and safety needs.

Figure 6:
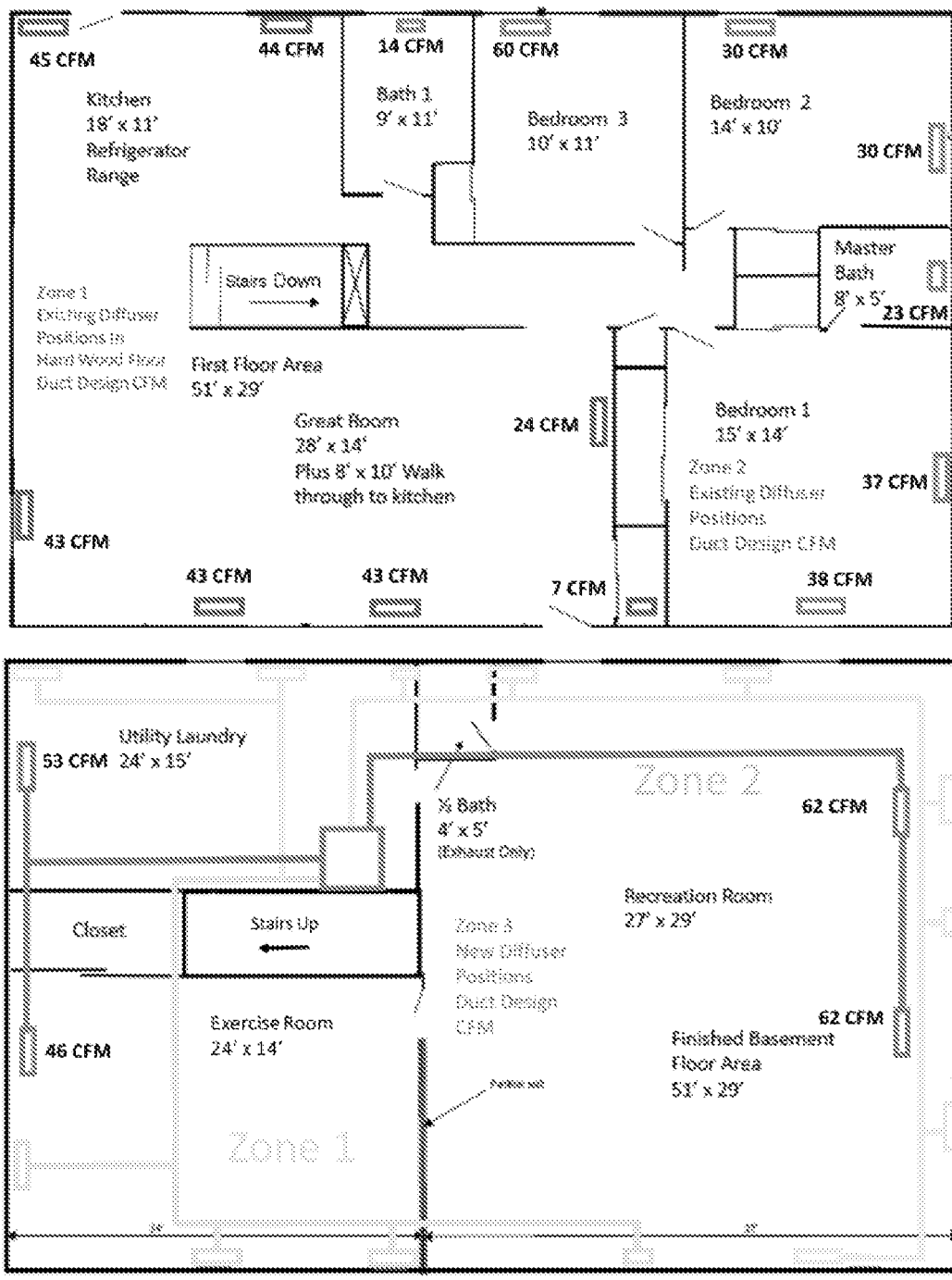
FIG. 6 shows the floor plan for which the values shown in FIGS. 3-5 were calculated.

It can be understood from the above calculations and the results shown in FIGS. 3-5 that the airflow capacities of the ducts in the examples differ substantially from standard duct airflows designed according to the J8 manual. For example, the diffusers labeled Kitchen 1 and Kitchen 2 in the first zone example shown in FIG. 3 are each increased in size to handle 102 CFM rather than 45 CFM, and the total zone CFM has increased from 249 CFM to 564.9 CFM. Of course, these values are exemplary in nature only and will vary depending on actual room and zone configurations. The specific room configuration for the values in Tables 3-5 is illustrated in FIG. 6.

For two speed systems, the duct design can be based on low speed CFM full flow capacities. The system would only be permitted to operate at higher speed when a second zone is opened or when one zone is designed to take more than 50% of the airflow, taking into account supply duct static pressure. Similar design considerations apply for multiple or variable speed systems, with the system designed to provide full flow to only one zone during low speed operation, and higher speeds permitted when more than zone is calling. Although this may result in less than full flow allocation to a zone, the airflow allocation will still be higher than for the calculated Manual J8 or other conventionally calculated loads.

In addition to increased CFM requirements for diffusers, those skilled in the art will appreciate that the return outlet and duct capacities must be increased accordingly. Other than increase airflow handling requirements, however, the system of the invention does not require any additional hardware and may utilize existing controller hardware, programmed to control the airflow in the manner described in connection with FIGS. 1 and 2, and to include the predetermined minimum airflow stop setting.

Finally, it is to be understood that the above embodiments are intended to illustrate the principles of the invention, and that the scope of the invention is defined by the appended claims. Variations and modifications of the preferred embodiments may be made without departing from the scope of the invention.

What is claimed is:

1. A method of controlling airflow in a multiple zone heating/air conditioning system, comprising the steps of:
   monitoring individual zone temperature control sensors by a controller, and when a sensor in a first calling zone sends a signal indicating that a temperature in the first calling zone is above or below a set point by a predetermined amount, operating a heating or cooling unit to heat or cool air and supplying the heated or cooled air to diffusers in the first calling zone via ducts, wherein the first calling zone is allocated all of the airflow output by the heating or cooling unit except for a predetermined minimum airflow output that is allocated to all other zones; and
   maintaining allocation of all of the airflow output to the first calling zone except for the predetermined minimum airflow output and preventing more than the predetermined minimum airflow output from being allocated to all other calling zones until the temperature in the first calling zone reaches a desired temperature, wherein the step of terminating the allocation of all of the airflow output except for the predetermined minimum airflow output to the first calling zone and instead supplying all of the airflow output except for the predetermined minimum airflow output to a second calling zone is accomplished by permitting diffusers in the first calling zone to remain open until diffusers in the second calling zone are fully open, and only then closing the dampers in the first calling zone to avoid over pressurization of the ducts.

2. A method of controlling airflow in a multiple zone heating/air conditioning system as claimed in claim 1, further comprising the step of terminating the full allocation of all of the airflow output except for the predetermined minimum airflow output to the first calling zone and instead supplying all of the airflow output except for the predetermined minimum airflow output to a second calling zone when the second calling zone has a priority that is higher than a priority of the first calling zone.

3. A method of controlling airflow in a multiple zone heating/air conditioning system as claimed in claim 1, further comprising the step of terminating the full allocation of all of the airflow output except for the predetermined minimum airflow output to the first calling zone and instead supplying all of the airflow output except for the predetermined minimum airflow output to a second calling zone when a temperature in the second calling zone deviates by a greater amount from a set point in the second calling zone than the temperature in the first calling zone deviates from the set point in the first calling zone.

4. A method of controlling airflow in a multiple zone heating/air conditioning system as claimed in claim 1, further comprising a step of delaying restart of the condenser after the temperature of the first calling zone has reached a predetermined temperature and no other zone has called.

5. A multiple zone heating and air conditioning system, comprising a plurality of ducts, diffusers and temperature control sensors with user-established set points in each zone, the diffusers being opened and closed by a central controller, wherein the central controller is programmed to execute instructions for controlling opening and closing of the ducts according to the following sequence of steps:

monitoring the zone temperature control sensors, and when a sensor in a first calling zone sends a signal indicating that a temperature in the first calling zone is above or below a set point by a predetermined amount, operating a heating or cooling unit to heat or cool air and supplying the heated or cooled air to diffusers in the first calling zone via ducts, wherein the first calling zone is allocated all of the airflow output by the heating or cooling unit except for the minimum airflow that is distributed to the other zones, wherein the controller is further programmed to execute instructions for terminating the allocation of all of the airflow output except for the predetermined minimum airflow output to the first calling zone and instead supplying all of the airflow output except for the predetermined minimum airflow output to a second calling zone by permitting diffusers in the first calling zone to remain open until diffusers in the second calling zone are fully open, and only then closing the dampers in the first calling zone to avoid over pressurization of the ducts, and wherein the ducts and diffusers in respective zones are arranged to accommodate an enlarged air flow calculated based on the formula:

Zone CFM=Total CFM−Minimum CFM (1)

where "Zone CFM" is an airflow allocated by a central controller to the zone, "Total CFM" is a total output of a central heating and/or air conditioning unit, and "Minimum CFM" is a minimum airflow distributed to other zones to ensure minimum adequate ventilation.

6. A multiple zone heating and air conditioning system as claimed in claim 5, wherein the minimum airflow is approximately 10% of "Total CFM".

7. A multiple zone heating and air conditioning system as claimed in claim 5, wherein the controller is further programmed to execute instructions for terminating the allocation of all of the airflow output except for the minimum airflow to the first calling zone and supplying all of the airflow output except for the minimum airflow to a second calling zone when the second calling zone has a priority that is higher than a priority of the first calling zone.

8. A multiple zone heating and air conditioning system as claimed in claim 5, wherein the controller is further programmed to execute instructions for terminating the allocation of all of the airflow output except for the predetermined minimum airflow output to the first calling zone and instead supplying all of the airflow output except for the predetermined minimum airflow output to a second calling zone when a temperature in the second calling zone deviates by a greater amount from a set point in the second calling zone than the temperature in the first calling zone deviates from the set point in the first calling zone.

9. A multiple zone heating and air conditioning system as claimed in claim 5, wherein the controller is further programmed to execute instructions for delaying restart of the condenser after the temperature of the first calling zone has reached a predetermined temperature and no other zone has called.

\* \* \* \* \*